US010914646B2

(12) United States Patent
Hung et al.

(10) Patent No.: US 10,914,646 B2
(45) Date of Patent: Feb. 9, 2021

(54) SYSTEM AND METHOD FOR MONITORING THE HEALTH OF STRUCTURES AND MACHINES USING FIBER BRAGG GRATING (FBG)

(71) Applicant: Optilab, LLC, Phoenix, AZ (US)

(72) Inventors: Henry Hung, Phoenix, AZ (US); Leijun Yun, Phoenix, AZ (US); Andre Brewer, Phoenix, AZ (US)

(73) Assignee: Optilab, LLC, Phoenix, AZ (US)

( * ) Notice: Subject to any disclaimer, the term of this patent is extended or adjusted under 35 U.S.C. 154(b) by 0 days.

(21) Appl. No.: 16/128,314

(22) Filed: Sep. 11, 2018

(65) Prior Publication Data

US 2019/0078949 A1 Mar. 14, 2019

Related U.S. Application Data

(60) Provisional application No. 62/557,073, filed on Sep. 11, 2017.

(51) Int. Cl.

| G01L 1/24 | (2006.01) |
|---|---|
| G01K 11/32 | (2006.01) |
| G01L 11/02 | (2006.01) |
| G01M 11/08 | (2006.01) |
| G01H 9/00 | (2006.01) |
| G01P 15/093 | (2006.01) |
| G01K 11/3206 | (2021.01) |

(52) U.S. Cl.
CPC ............ *G01L 1/246* (2013.01); *G01H 9/004* (2013.01); *G01K 11/3206* (2013.01); *G01L 11/025* (2013.01); *G01M 11/085* (2013.01); *G01P 15/093* (2013.01)

(58) Field of Classification Search
CPC ....... G01L 1/246; G01L 11/025; G01H 9/004; G01H 9/006; G01M 11/085
See application file for complete search history.

(56) References Cited

U.S. PATENT DOCUMENTS

| 6,449,400 B1 * | 9/2002 | Watanabe .......... G01M 11/3109 385/12 |
|---|---|---|
| 9,726,538 B2 | 8/2017 | Hung |
| 9,989,866 B2 * | 6/2018 | Mason ................ G03F 7/70041 |
| 2009/0262760 A1 * | 10/2009 | Krupkin ................ G01S 7/4818 372/6 |

(Continued)

*Primary Examiner* — Dominic J Bologna
(74) *Attorney, Agent, or Firm* — Loza & Loza, LLP; George L. Fountain

(57) ABSTRACT

An optical-based system for sensing parameters of a structure or machine for monitoring the health of the structure or machine. The optical-based system includes a set of optical fibers, each optical fiber including a set of fiber Bragg grating (FBG) sensors for sensing a set of parameters of the object; a set of interrogators configured to generate a set of incident optical signals for transmission via the set of optical fibers, respectively, receive a set of reflected optical signals from each of the optical fibers of the set, and generate a set of data related to sensed parameters of the object based on the set of reflected optical signals; and a controller configured to control the set of interrogators. Via a user interface or a remote computer on a cloud, sensing instructions may be provided to the controller, and sensed data and other information may be received from the controller.

24 Claims, 10 Drawing Sheets

(56) References Cited

U.S. PATENT DOCUMENTS

| | | | |
|---|---|---|---|
| 2011/0007996 A1* | 1/2011 | Huffman | G01M 5/0025 385/13 |
| 2012/0179378 A1* | 7/2012 | Duncan | E21B 47/123 702/8 |
| 2013/0070235 A1* | 3/2013 | Chen | G01L 11/025 356/73 |
| 2014/0119687 A1* | 5/2014 | Hao | G01L 1/246 385/12 |
| 2014/0152995 A1* | 6/2014 | Dong | G01L 1/246 356/477 |
| 2016/0191163 A1* | 6/2016 | Preston | G01B 11/161 398/16 |
| 2018/0299301 A1* | 10/2018 | Raghavan | G01D 5/35351 |
| 2019/0072379 A1* | 3/2019 | Jalilian | G01M 3/002 |

\* cited by examiner

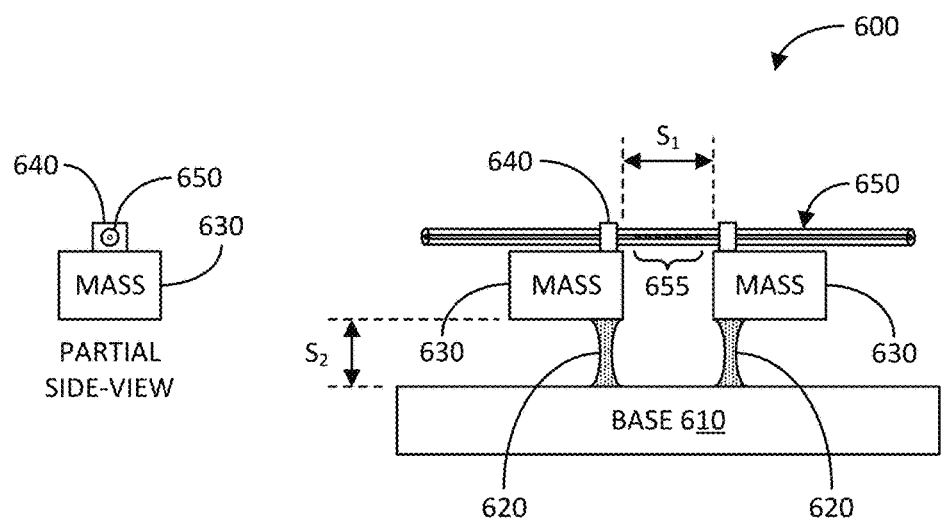
FIG. 6A
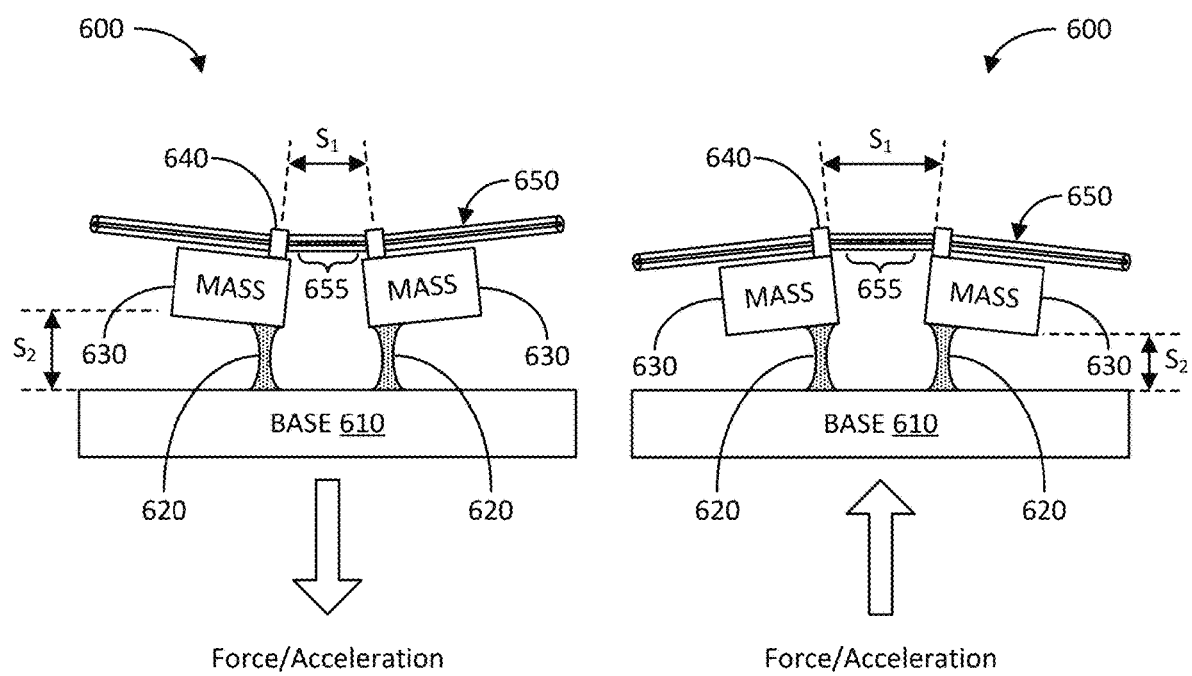
FIG. 6B
FIG. 6C

SYSTEM AND METHOD FOR MONITORING THE HEALTH OF STRUCTURES AND MACHINES USING FIBER BRAGG GRATING (FBG)

CROSS-REFERENCE TO RELATED APPLICATION

This application claims the benefit of the filing date of Provisional Application Ser. No. 62/557,073, filed on Sep. 11, 2017, which is incorporated herein by reference.

BACKGROUND

Field

Aspects of the present disclosure relate generally to structure and machine monitoring, and in particular, to a system and method for monitoring the health of structures and machines using fiber Bragg grating (FBG).

Background

A structure or machine may exhibit certain characteristics prior to a failure occurring in the structure or machine. As an example, a structure or machine may vibrate in a particular manner indicating that a failure may be imminent. A structure or machine may be subjected to an unusually high strain prior to failure. The temperature of a structure or machine may be above a safe temperature range indicating an actual or potential failure. Other characteristics of a structure or machine may indicate the health of the structure or machine. Monitoring such characteristics of a structure or machine may be useful in preventing failures of the structure or machine.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus including at least one optical fiber including at least one fiber Bragg Grating (FBG) sensor coupled to or situated proximate an object; at least one interrogator configured to generate at least one incident optical signal for transmission via the at least one optical fiber, respectively, receive at least one reflected optical signal from each of the at least one optical fiber, and generate data of at least one sensed parameter of the object based on at least one wavelength of the at least one reflected optical signal; and a controller configured to control the at least one interrogator.

Another aspect of the disclosure relates to an apparatus including a set of optical fibers, wherein each of the optical fibers includes a set of fiber Bragg Grating (FBG) sensors coupled to or situated proximate an object; a set of interrogators configured to generate a set of incident optical signals for transmission via the set of optical fibers, respectively, receive a set of reflected optical signals from each of the optical fibers of the set; and generate a set of data related to sensed parameters of the object based on the set of reflected optical signals; and a controller configured to control the set of interrogators.

Another aspect of the disclosure relates to a system including at least one optical fiber including at least one fiber Bragg Grating (FBG) sensor coupled to or situated proximate an object; at least one interrogator configured to: generate at least one incident optical signal for transmission via the at least one optical fiber, respectively, receive at least one reflected optical signal from each of the at least one optical fiber and generate data of at least one sensed parameter of the object based on at least one wavelength of the at least one reflected optical signal; a controller configured to control the at least one interrogator; and a remote computer configured to communicate with the controller via a network cloud.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

BRIEF DESCRIPTION OF THE DRAWINGS

FIGS. 6A-6C illustrate side views of an exemplary FBG sensor for sensing acceleration, force, or vibration in its intrinsic, compressed, and expanded states in accordance with another aspect of the disclosure.

DETAILED DESCRIPTION

Figure 1:
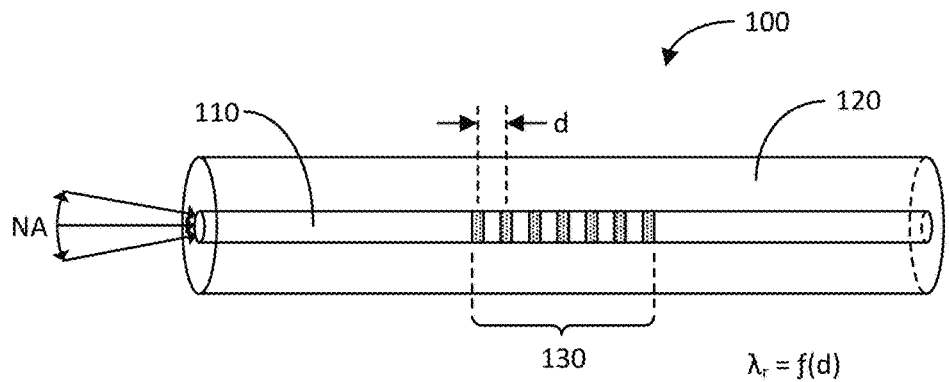
FIG. 1 illustrates a side view of an exemplary fiber Bragg Grating (FBG) fiber in accordance with an aspect of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Scope

Sensors are used to monitor, essentially, every measurable phenomenon known to science, and there are always many ways to sense the same thing. In fact, many times, there are several distinct kinds of sensors sensing the same thing, at the same time—just in case. Sensors monitor climate data, structural health, traffic movement, human movement, animal behavior, space, the sky, the ground, under the ground . . . the list could go on and on. The take away here is that sensors are ubiquitous. However, this ubiquity induces a complimentary variety in sensing methodology and interaction.

For the scientist and engineer, the ubiquity-inspired variety is a blessing—and a curse. For the numerous options of sensor types and sensing methods, it is often difficult to narrow down options using completely objective parameters. There are often many kinds of sensors that can be used, all with similar specification and at similar prices. The market has been shifting from just producing devices that work well enough to be useful, to providing systems that, not only work, but also create an experience that consists of some combination of ease and memorability.

At the risk of exuding hubris, this disclosure relates to the creation of a paradigm shift in the sensing world—a portable, easy-to-use, cloud-enabled system that exhibits industry-leading sensitivity, usability and aesthetic design. Particularly lending itself to Structural Health Monitoring (SHM) and Condition Monitoring (CM) disciplines, the solution described herein may become a standard for SHM and CM sensing systems, and inspire the next generation of user-oriented sensing solutions.

Sensing Parameters in Structural Health Monitoring

A simple working definition of SHM is: "The process of implementing a damage identification strategy for aerospace, civil, and mechanical engineering infrastructure damage where the damage identification process is generally thought to entail establishing: (i) the existence of damage, (ii) the damage locations, (iii) the types of damage, and (iv) the damage severity."

As delineated in the Royal Society Proceedings A, there are seven fundamental axioms of SHM of structural health monitoring as listed below. Note that the last six all deal with sensor and data aspects. Also, these can easily be applied to condition monitoring (CM):

1. All materials have inherent flaws or defects.
2. The assessment of damage requires a comparison between two system states.
3. Identifying the existence and location of damage can be done in an unsupervised learning mode, but identifying the type of damage present and the damage severity can generally only be done in a supervised learning mode.
4. A) Sensors cannot measure damage. Feature extraction through signal processing and statistical classification is necessary to convert sensor data into damage information. B) Without intelligent feature extraction, the more sensitive a measurement is to damage, the more sensitive it is to change in operational and environmental conditions.
5. The length- and time-scales associated with damage initiation and evolution dictate the required properties of the SHM sensing system.
6. There is a trade-off between the sensitivity to damage of an algorithm and its noise rejection capability.
7. The size of damage that can be detected from changes in system dynamics is inversely proportional to the frequency range of excitation.

Studying these axioms, all but the first axiom deals directly with the specifications and properties of the sensors, sensor data analysis, and data management. Obviously, competent SHM can only be done with a keen understanding of the phenomena being sensed so that the appropriate sensors are used, and appropriate insightful analysis is conducted. Now, SHM is a large field and it is not practical herein to touch every part of it here. However, looking at general requirements and discipline-wide aspects, a solid idea of the sensing requirements can be reached.

SHM—General Requirements

What most readily comes to mind in SHM is the monitoring of large structures that, ideally, do not move large distances, do not accelerate or vibrate with high frequencies or large amplitudes, and have relatively constant temperatures. In other words, large rapid changes are usually indications of issues that one would rather not see. The following are a few basic sensing guidelines for SHM from the sensing point of view.

SHM—Accuracy

Accuracy is always key. Sensors need to provide accurate measurements, for example ≤0.1° C. (degree Celsius) or ≤0.1 g (gram). Of course, these are just general guidelines and dependent on the situation, budget, etc.

SHM—Sampling Rate

Lower sampling rates are acceptable for most applications ≤50 Hertz (Hz). In some cases, the sampling rate in the sub-Hertz region may be acceptable since changes over large spans of time may indicate health issues, which are generally of primary interest. Again, depending on the structure, this generalization may not apply.

SHM—Data Management

Since many SHM applications monitor structures for long spans of time—months, years, even decades—vast quantities of data need to be stored. Many analyses are concerned with slow structural behaviors over long periods of time or "spot check" analysis. Therefore, robust storing capabilities are a must and data retrieval needs to be particularly suited to big data.

Sensing Parameters in Condition Monitoring

Condition monitoring is the practice of monitoring equipment in order to study performance, and characterize and prevent failure. Many times, equipment is studied under controlled conditions, even being pushed to failure while being monitored, so that during normal operations, failure can be prevented through continuous analysis of the data to detect the beginning signs of failure or operational issues. The variety of machines, both large and small, that are in operation in our industrialized world produce a vast number of different requirements for CM systems, but looking at general requirements and discipline-wide aspects, a solid idea of the sensing requirements can be reached.

CM—General Requirements

In CM, a common machine to monitor is a compressor or pump, since it is used in nearly every industrial process. For this kind of machine, there is substantial vibration (even under perfect operating conditions), and failure can occur very rapidly.

CM—Accuracy

In this regime, sensors need to provide accurate measurements ≤0.1° C. or ≤0.1 g, but if the changes are of more importance, the accuracy can be relaxed.

CM—Sampling Rate

Most applications require extremely fast sampling rates, ≥1000 Hz, due to rapid operational changes.

CM—Data Management

Many machines have limited life spans, but during that span, the high sampling rates generate large amounts of data. Depending on the operation style of the machine, whether it is turned off periodically or runs until failure or maintenance, CM of the machine can dramatically affect the amount of data needed for analysis. If a pump is turned off every shift and day-by-day failure analysis is only required, then the data only needs to be stored during the operation of the pump, and can be flushed every day. Other scenarios, such as when the equipment is expected to operate for several months, substantial amounts of data will need to be stored for comparison purposes.

Structural Health and Condition Monitoring Comparison

In many ways, both SHM and CM are quite similar. The seven (7) axioms of SHM could easily find their analogs for CM, and the importance of the sensing and data management cannot be overstated for both. The most obvious similarity is that both SHM and CM can require large amounts of data—in CM due to the high sampling rates needed, and in SHM due to the long time-spans for analysis.

The most obvious difference is the required sampling rates needed. SHM, in many cases, needs an order of magnitude less of samples per second than CM due to the differing time spans involved in analysis. Really, only if vibrational monitoring is pursued in a structural setting does the necessary SHM sampling rate approach that of CM applications. On the other hand, CM applications mostly require high sampling rates, even in non-vibrational monitoring situations due to the more rapid changes that are usually observed in machines versus structures.

Accuracy really depends on the situation. This is not usually a question of whether the accuracy can be low, but essentially what is most important: namely the exact value of the phenomena or the trend (change) in the phenomena, as many times, accuracy and speed have an inverse relationship.

A simple comparison between SHM and CM monitoring requirements is summarized below in the following table:

|  | SHM | CM |
| --- | --- | --- |
| Accuracy | High | Medium |
| Sampling | Low | High |
| Data | Medium | High |

Although individual situations will warrant different specifications, the general specifications for SHM and CM have the above split with sampling being the most different requirement and data volume and analysis capacity requirements being very similar.

Sensing Needs and Introducing Photonic Solution

Figure 13:
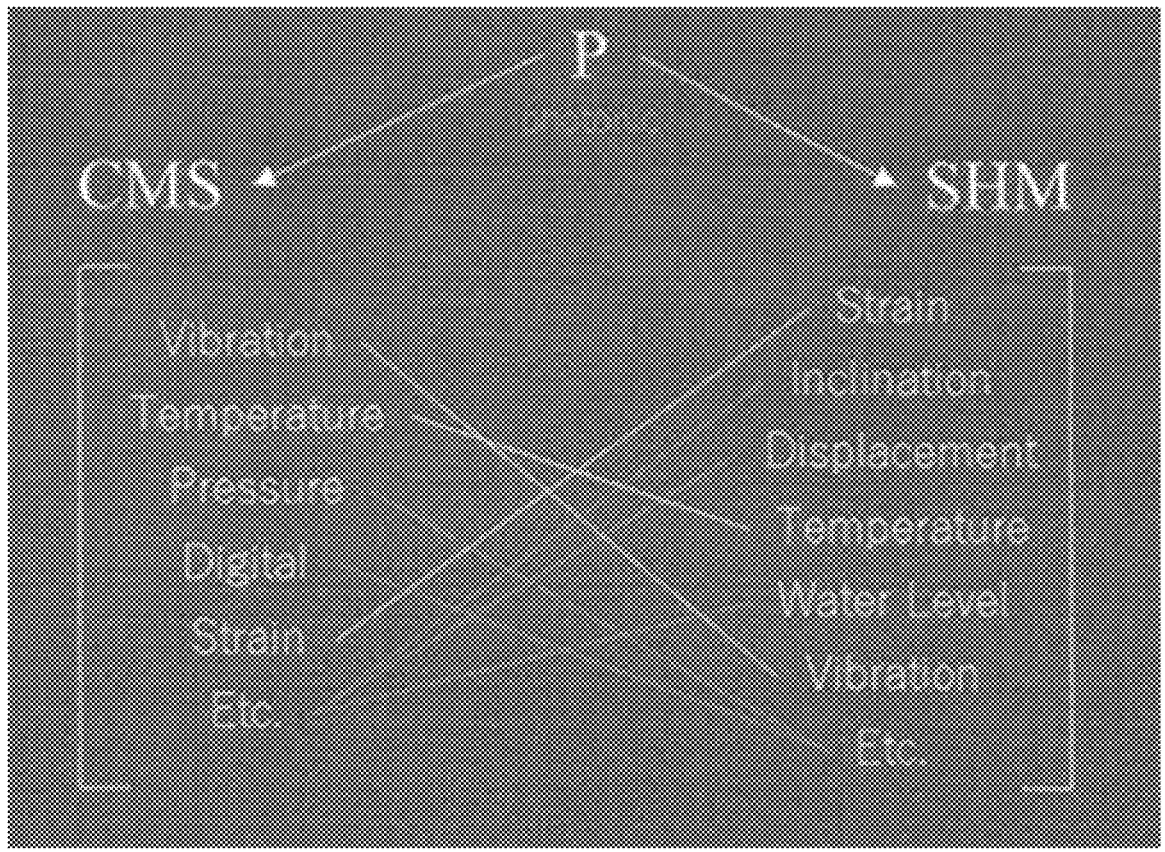
FIG. 13 shows a list of some commonly used sensing types, in an approximate order of commonality within the field.

Both CM and SHM applications share sensing similarities. FIG. 13 shows a list of some commonly used sensing types, in an approximate order of commonality within the field. Vibration (or acceleration), temperature and strain are used in both areas quite frequently. The photonic solution will be explored further along, applies to both areas and all the below listed sensing needs. When the photonic solution is applied to CM, it is referred to herein as "PCMS" or "Photonic Condition Monitoring System," when applied to SHM, it is referred to herein as "PSHM system" or "Photonic Structural Health Monitoring system."

The Fiber Advantage

Before discussing in detail the sensing system described herein and its applications to SHM and CM, a quick review of why one would choose a fiber optic-based methods is in order. A lightning review of fiber optic fundamentals and FBG (Fiber Bragg Grating) base sensing is provided. Particular advantages that FBG sensing presents to SHM and CM is discussed as follows. Keep in mind, there are several more advantages to FBG sensing, but the ones that will be mentioned are particularly for SHM and CM.

In Structural Health Monitoring

In SHM applications, an ideal sensor would be maintenance free, long-lasting, robust, and able to be used remotely while delivering sufficient accuracy. In SHM, sensors used for years or decades, are sometimes embedded in structures that are being monitored, and are used to monitor structures for which access can be difficult or costly, such as a dam or remote solar facility.

Remote Sensing

Since fiber optics are used, the sensors can be connected to interrogators with up to a kilometer (km) of fiber. This is valuable, for example, for embedded sensors for which the fiber would only be able to enter a structure at a place far from the embedded sensor due to architectural or structural considerations.

Cascade Sensing

Due to the passive nature of the sensors, one transmission line can "host" multiple sensors. Sensors can be added to the sensor chain as needed. Say an extra floor is added to a building, sensors can just be cascaded onto the original fiber line by just plugging in.

Passive Operation Sensing

FBG sensors work based on inherent physical principles and do not need power or instructional interfaces to function. Light runs through them and specific wavelengths are reflected back. Only a fiber line is needed. No calibration is necessary on the user's part either, as there are no settings to change. This results in zero maintenance sensors that can be embedded or placed and left alone.

In Condition Monitoring

In CM, the ideal sensor would also be maintenance-free and be unaffected by the environmental disturbances that are common in many industrial sectors including electromagnetic disturbances.

Passive Operation Sensing

Since the sensors do not need calibration or communication interfaces, the sensor itself is particularly robust. For example, non-FBG temperature sensors can be fragile and would not be used on a piece of machinery that is constantly vibrating during operation. With FBG sensors, all of the sensors are robust and would remain unaffected.

Electric- and Magnetic-Free Sensing

Electrical and magnetic influences do not affect the sensing abilities or transmission of fiber-light based sensing. This sensing is particularly advantageous in electricity generating scenarios or transforming stations.

Fiber and FBG Fundamentals

Optical fibers are available in many varieties for different applications, but all have the same basic working principle—light is coupled to the propagating core, which as a different refractive index than the surrounding cores and/or cladding. Refractive indices are related to the speed of light within a specific medium. A perfect vacuum has a refractive index of one (1) and all other media have indices greater than 1. The refractive indices of the core and the cladding typically differ only by ~0.02 or less. As long as the light is coupled within the numerical aperture (NA) of the propagating core, the light will be internally reflected and propagate through the core with little loss.

The above rendition is simplified. Various cladding schemes, core types, doping (for amplification and lasers), and coating types are commercially available, depending on the desired application and will not be discussed here.

If the propagating core is altered so that a structured alternation of area of differing refractive indices are present, light will interact in the same way as with a distributed Bragg reflector. A distributed Bragg reflector acts as a mirror for a specific wavelength of light by taking advantage of Fresnel reflections at the interfaces of different refractive indices in this case. The specific pattern of the alternations and the refractive indices used determines which central wavelength is reflected and its bandwidth. This is called Fiber Bragg Grating (FBG) and finds an obvious use in optical filtering within optical fibers.

When an FBG is made within a fiber, typically with UV light via interference patterns or photomasking methods, the refractive indices are fixed. However, the distances between the volumes of similar refractive index can be changed if the fiber is strained. Although the distance change is small, only slight changes in the distances are needed to produce essentially completely different FBGs that reflect different wavelengths. If an FBG is in its "normal" state, at a specified temperature and tension, the FBG will reflect a specific wavelength of light. Temperature changes cause the fiber to expand or contract, changing the FBG internal structure, causing a different wavelength of light to be reflected. The same is true if the tension on the fiber is changed, the FBG is changed whether the tension is increased or decreased, and the reflecting wavelength is changed.

To sense with FBGs then is now clear to demonstrate. For a given FBG, the wavelengths at various levels of strain are measured. Either a lookup table can be used, or an analytical expression can be used to calibrate the FBG strain sensor. Then, under normal operation, the light that is reflected to the source is measured, and the strain that the FBG is under can be inferred. The same is true for temperature. Of course, care must be taken that a strain sensor does not come under much temperature change and vice versa, unless both are used in tandem so that simultaneous temperature and strain changes can be distinguished. These and other details are considered by designers in making accurate and robust fiber sensors. These FBG fiber principles are discussed with reference to a more concrete exemplary implementation as follows.

FIG. 1 illustrates a side view of an exemplary fiber Bragg Grating (FBG) fiber 100 in accordance with an aspect of the disclosure. For the purposes of this disclosure, an FBG fiber is defined as any fiber (single mode (SM), polarization-maintaining (PM), doped or un-doped, various pump claddings, etc.) which contains a Fiber Bragg Grating (FBG) in a segment of the fiber.

The FBG fiber 100 includes a cylindrical core 110 coaxially surrounded by a cladding 120. The core 110 of the FBG fiber 100 includes at least one FBG segment 130 including a series of alternating regions 130 of differing refractive index, which is designed to be reflective to a specific wavelength or bandwidth of electromagnetic radiation in its intrinsic state (no stresses of any kind). The distance or period "d" between adjacent regions of the same refractive index determines the wavelength $\lambda_r$ of the electromagnetic radiation reflected by the FBG segment 130 (e.g., $\lambda_r = f(d)$).

As illustrated, an incident optical signal may be introduced into the FBG fiber 100 via the numerical aperture (NA) of the fiber.

Figure 2:
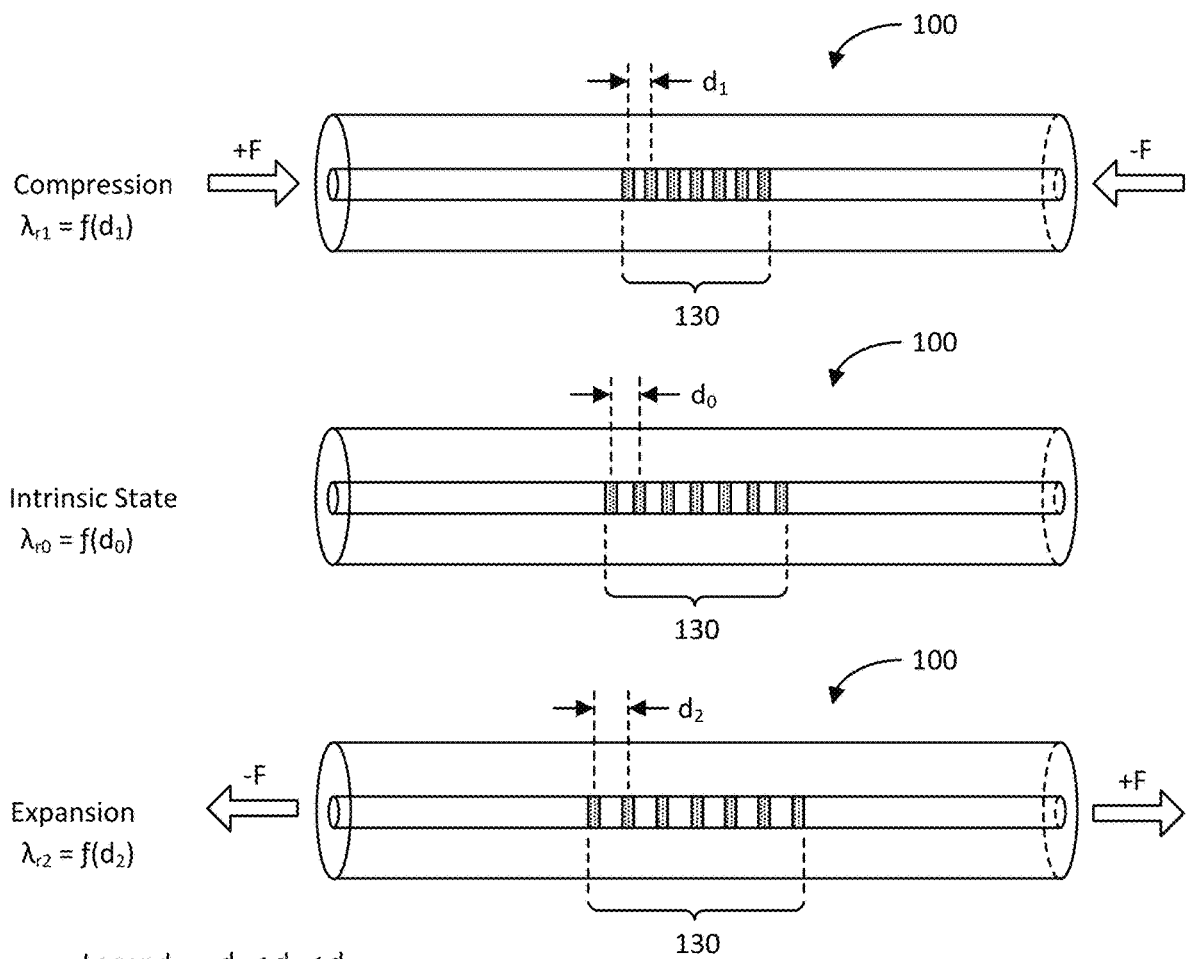
FIG. 2 illustrates side views of the exemplary fiber Bragg Grating (FBG) fiber of FIG. 1 from top-to-bottom in compressed, intrinsic, and expanded states in accordance with another aspect of the disclosure.

FIG. 2 illustrates side views of the exemplary FBG fiber 100 from top-to-bottom in compressed, intrinsic, and expanded states in accordance with another aspect of the disclosure. If the FBG fiber 100 is expanded or compressed, as shown in the upper or lower depiction of the FBG fiber 100 in FIG. 2, the spacing or periodicity $d_1$ or $d_2$ associated with the FBG segment 130 is changed; thereby changing the wavelength or bandwidth of the reflected electromagnetic radiation determined by Fresnel reflections at the refractive interfaces.

For example, when the FBG fiber 100 is compressed, the spacing or periodicity $d_1$ associated with the FBG segment 130 is less than the distance or periodicity $d_0$ of the FBG segment 130 when the FBG fiber 100 is in its intrinsic state (shown in the middle in FIG. 2). When the FBG fiber 100 is expanded, the distance or periodicity $d_2$ associated with the FBG segment 130 is greater than the distance or periodicity $d_0$ of the FBG segment 130 when the FBG fiber 100 is in its intrinsic.

Accordingly, the wavelength $\lambda_{r1}$ of an optical signal reflected off the compressed FBG fiber 100, which is a function of the distance or periodicity $d_1$ of the FBG segment 130 ($\lambda_{r1}=f(d_1)$) is less than the wavelength $\lambda_{r0}$ of an optical signal reflected off the intrinsic FBG fiber 100 ($\lambda_{r1}=f(d_1)<(\lambda_{r0}=f(d_0))$). Similarly, the wavelength $\lambda_{r0}$ of an optical signal reflected off the intrinsic FBG fiber 100 is less than the wavelength $\lambda_{r2}$ of an optical signal reflected off the expanded FBG fiber 100 (($\lambda_{r0}=f(d_0)<(\lambda_{r2}=f(d_2))$).

A sensor directs a force or acceleration to the FBG fiber 100 in such a way that the force acts upon the FBG fiber 100 in the way prescribed in FIG. 2. A spectrum of electromagnetic radiation is sent through the FBG fiber 100 and the force/acceleration is determined by the wavelengths that are reflected. Under no forces, the FBG fiber 100 is said to be in its intrinsic state. When the intrinsic wavelength is being reflected, it is known that there is no force acting upon the FBG fiber 100. Reflecting wavelengths differing from that intrinsic wavelength are the result of forces acting upon the FBG fiber 100. The exact calibration of wavelength-to-force is determined by the specific mechanical design and can be modified to desired specifications.

The Photonic SHM or CM Sensing System

The photonic solution to both SHM and CM applications described herein is fully portable, cloud-enabled, aesthetically designed and robust. This sensing solution is easily integrateable into existing SHM and CM systems and is fully capable of being a standalone solution. The three fundamental parts of photonic sensing system are the following:

The Sensors

Any FBG sensor can be used as part of the photonic sensing system. The FBG sensor described herein may be configured to deliver industry leading range.

The Interrogator

The photonic sensing system includes an interrogator that serves as the heart of the PCMS or PSHM system. With touchscreen interface and on-board processing, and a highly integrated photonic sensing technology that processes all wavelength data, the interrogator can be operated independently, as a node in a larger system.

The Cloud Platform

The interrogator includes a network interface that allows communication to a computer system on the cloud for cloud powered data processing, analysis, real-time monitoring and remote control of the interrogator. Through the interrogator being cloud-connected, a fully automated, integrated fiber system of any size with sensors anywhere on the planet can be achieved.

The PCMS or PSHM system has been designed with the user in mind. Many FBG based sensing systems are quite complicated to use. However, the PCMS or PSHM system is simple to use. FBGs are situated along the fiber lines and placed where needed. The fiber line is connected to an interrogator. Through an intuitive touchscreen, the user quickly sets the sensors on each of the up to four (4) or more fiber lines, giving the interrogator the appropriate information to interpret data properly. Sensing is begun by the touch of a button and data can be viewed real-time on the interrogator. After setting up an account on a remote computer system on the cloud, a quick password entry on the interrogator allows for continuous uploading of data. The aforementioned concepts are now explained with reference to the following exemplary implementations.

Figure 3:
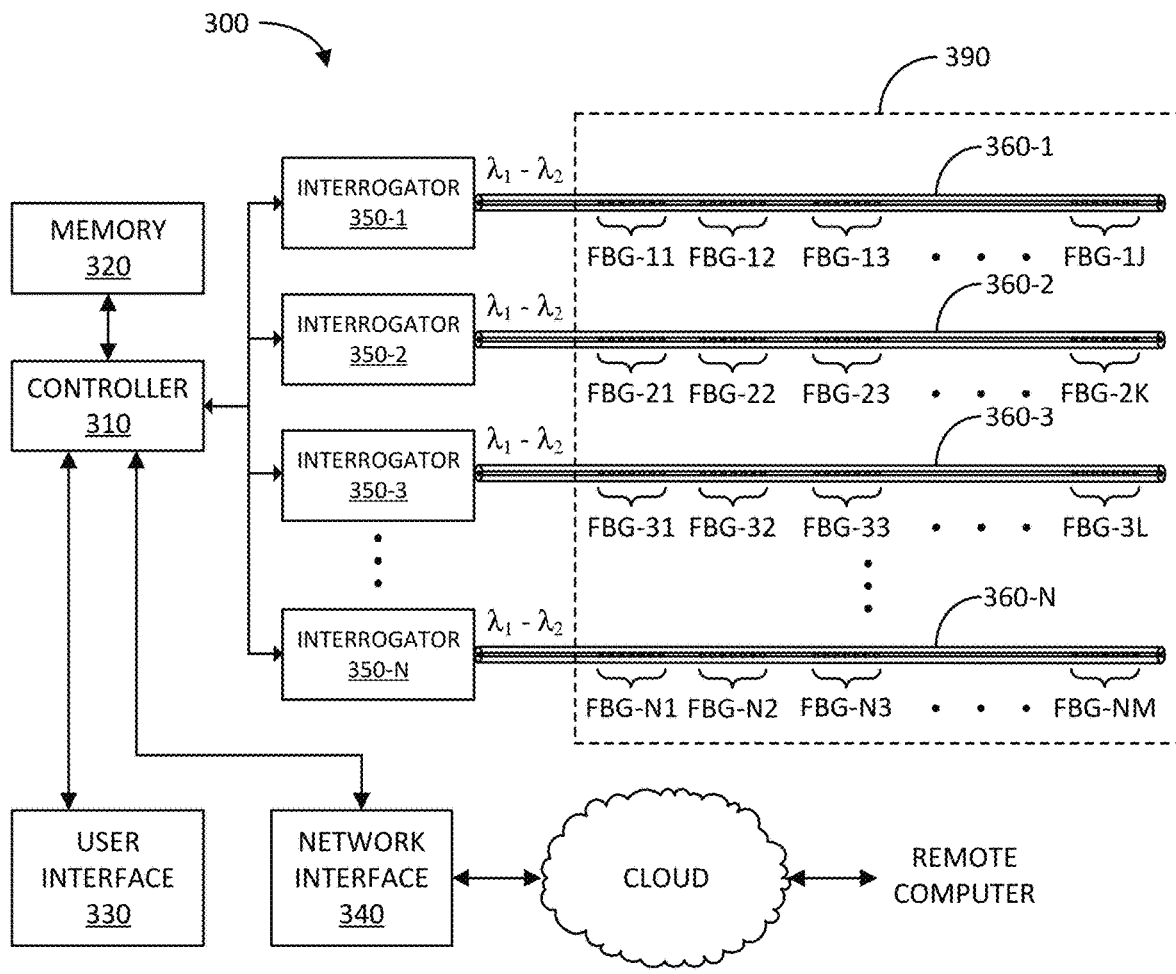
FIG. 3 illustrates a block diagram of an exemplary system for monitoring the health of an object (e.g., a structure or machine) in accordance with another aspect of the disclosure.

FIG. 3 illustrates a block diagram of an exemplary system 300 for monitoring the health of an object 390 (e.g., a structure or machine) in accordance with another aspect of the disclosure. The system 300 includes a set of one or more optical fibers 360-1 to 360-N. Each of the one or more optical fibers 360-1 includes a set of one or more Fiber Bragg Grating (FBG) sensors. For example, optical fiber 360-1 includes FBG sensors FBG-11 to FBG-1J; optical fiber 360-2 includes FBG sensors FBG-21 to FBG-2K; optical fiber 360-3 includes FBG sensors FBG-31 to FBG-3L; and so on including optical fiber 360-N with FBG sensors FBG-N1 to FBG-1M. Each optical fiber including one or more FBG sensors is referred to herein as an FBG fiber.

In this example, the integer N can be one (1) or more. Similarly, any of the integers J, K, L to M can be one (1) or more. The FBG sensors may be placed strategically at different locations along the object 390 to achieve the desired sensing. Furthermore, the FBG sensors may be configured for sensing different parameters of the object 390. For example, the FBG sensors may be configured for sensing vibration, acceleration, force, strain, pressure, temperature, displacement, etc.

The different types of FBG sensors may be arranged in an N by M array in any desired manner. For example, the FBG sensors for a particular FBG fiber may be configured for sensing the same type of parameter of the object 390. For instance, the FBG sensors FBG-11 to FBG-1J of FBG fiber 360-1 may all be configured for sensing vibration, acceleration or force at different locations along the object 390. Similarly, the FBG sensors FBG-21 to FBG-2K of FBG fiber 360-2 may all be configured for sensing strain at different locations along the object 390. The FBG sensors FBG-31 to FBG-3J of FBG fiber 360-3 may all be configured for sensing pressure at different locations along the object 390. And so on, including the FBG sensors FBG-N1 to FBG-NJ of FBG fiber 360-N being configured for sensing temperature at different locations along the object 390.

Alternatively, each FBG fiber may include a mixture of FBG sensors for sensing different types of parameters of the object 390. For example, the FBG sensors FBG-11 to FBG-1J of FBG fiber 360-1 may configured for sensing vibration, strain, pressure, temperature, and displacement at different locations along the object 390. This mixing of sensing different types of parameters of the object 390 may be implemented in the remaining FBG fibers 360-2 to 360-N. Alternatively, one or more of the FBG fibers may each include sensors configured for sensing the same type of parameters of the object 390, and other one or more FBG fibers may each include sensors configured for sensing different types of parameters of the object 390, respectively.

The system 300 further includes a set of interrogators 350-1 to 350-N for generating an incident optical signal for each of the FBG fibers 360-1 to 360-N, and receiving and processing one or more reflected optical signals from each of the FBG fibers 360-1 to 360-N. The incident optical signal may be a broadband signal having a wavelength range $\lambda_1$ to $\lambda_2$, which may be transmitted as a single broadband transmission or may be wavelength swept in a time-based manner. It shall be understood that the wavelength range of the incident optical signal $\lambda_1$ to $\lambda_2$ may be programmable depending on the bandwidth of the expected reflected optical signal from each of the FBG fibers 360-1 to 360-N, as discussed further herein.

The wavelength of the one or more reflected optical signals from each of the FBG fibers 360-1 to 360-N is a function of the one or more parameters being sensed by the corresponding one or more FBG sensors. For example, if FBG sensor FBG-11 of FBG fiber 360-1 is configured for sensing temperature at a particular location along the object 390, the reflected optical signal generated by the FBG sensor FBG-11 in response to the incident optical signal is a function of the temperature of the object 390 at that particular location. For instance, if the temperature of the object 390 at that particular location increases (causing the corresponding FBG sensor to expand), the wavelength of the reflected optical signal increases. If, on the other hand, the temperature of the object 390 at that particular location decreases (causing the corresponding FBG sensor to contract), the wavelength of the reflected optical signal decreases.

Figure 4:
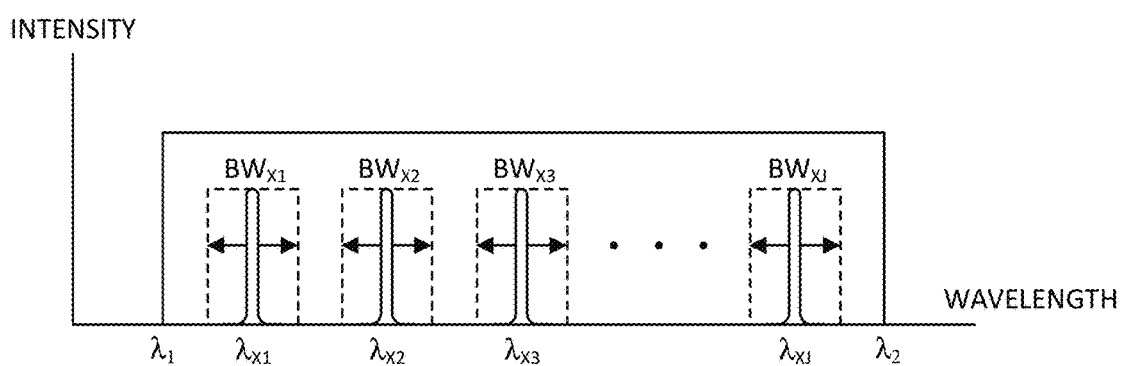
FIG. 4 illustrates a graph of intensity versus wavelength of an incident optical signal and reflected optical signals propagating via a Fiber Bragg Grating (FBG) fiber in accordance with another aspect of the disclosure.

FIG. 4 illustrates a graph of intensity versus wavelength of an incident optical signal $\lambda_1$ to $\lambda_2$ and reflected optical signals $\lambda_{X1}$ to $\lambda_{XJ}$ propagating via the (FBG) fiber 360-1 in accordance with another aspect of the disclosure. The y- or vertical-axis of the graph represents intensity of the incident optical signal and the reflected optical signals. The x- or horizontal-axis of the graph represents wavelengths of the incident optical signal and the reflected optical signals. Although the discussion is with reference to FBG fiber 360-1, it shall be understood that it applies to the other FBG fibers 360-2 to 360-N.

As illustrated, the incident optical signal should have a wavelength range $\lambda_1$ to $\lambda_2$ that overlaps the expected wavelength bandwidths $BW_{X1}$ to $BW_{XJ}$ of the reflected optical signals generated by the FBG sensors FBG-11 to FBG-1J, respectively. As an example, if the FBG fiber 360-1 only has a single FBG sensor FBG-11, the incident optical signal should have a wavelength range such that its minimum wavelength $\lambda_1$ is slightly lower (e.g., within a margin of error) than the minimum wavelength of the expected bandwidth $BW_{X1}$ of the reflected optical signal associated with FBG sensor FBG-11, and its maximum wavelength $\lambda_2$ is slightly higher (e.g., within a margin of error) than the maximum wavelength of the expected bandwidth $BW_{X1}$ of the reflected optical signal associated with FBG sensor FBG-11.

If, for example, the FBG fiber 360-1 only has two FBG sensors FBG-11 and FBG-12, the incident optical signal should have a wavelength range such that its minimum wavelength $\lambda_1$ is slightly lower (e.g., within a margin of error) than the minimum wavelength of the expected bandwidth $BW_{X1}$ (lowest in wavelength) of the reflected optical signal associated with FBG sensor FBG-11, and its maximum wavelength $\lambda_2$ is slightly higher (e.g., within a margin of error) than the maximum wavelength of the expected bandwidth $BW_{X2}$ (highest in wavelength) of the reflected optical signal associated with FBG sensor FBG-12. This applies to when the FBG fiber 360-1 includes more than two FBG sensors, and also applies to the other FBG fibers 360-2 to 360-N.

Each interrogator is able to determine from which FBG sensor the reflected optical signal is generated based on its wavelength. For example, if the interrogator determines that the wavelength of the reflected optical signal lies within the bandwidth $BW_{X1}$, then the interrogator is able to determine that such reflected optical signal comes from FBG sensor FBG-11. If the interrogator determines that the wavelength of the reflected optical signal lies within the bandwidth $BW_{XJ}$, then the interrogator is able to determine that such reflected optical signal comes from FBG sensor FBG-1J. In other words, the bandwidths $BW_{X1}$ to $BW_{XJ}$ should be non-overlapping.

Referring again to FIG. 3, the controller 310, based on sensing instructions received via a user interface 330 and/or a remote computer on the cloud via a network interface 340, controls the interrogators 350-1 to 350-N. For example, the controller 310 may control each of the interrogators 350-1 to 350-N to generate an incident optical signal with a particular wavelength range $\lambda_1$ to $\lambda_2$. The wavelength range $\lambda_1$ to $\lambda_2$ of the incident optical signals generated by the interrogators 350-1 to 350-N may all be the same or different as desired. Further, the controller 310 may control each of the interrogators 350-1 to 350-N to generate an incident optical signal with a particular interrogation rate to achieve a desired sampling rate for the sensing data generated.

As previously discussed, if the object is a structure without any moving parts (e.g., a bridge structural member, a building structural member, etc.), the interrogation rate of the incident optical signal may be relatively low (e.g., <50 Hz or even in the sub-Hz region as discussed above with reference to an SHM application). If the object is a machine with moving parts (e.g., a pump, compressor, etc.), the interrogation rate of the incident optical signal may be relatively high (e.g., >1000 Hz as discussed above with reference to a CM application). These are just general rules, and the interrogation rate should be designed based on the particular SHM and/or CM application being implemented.

The controller 310 receives the sensing data from the interrogators 350-1 to 350-N, and may perform various operations with respect to the sensing data based on the sensing instructions received via the user interface 330 and/or the remote computer on the cloud via the network interface 340. For example, the controller 310 may store the sensing data in a memory device 320, which may be a non-volatile and/or volatile memory device (e.g., random access memory (RAM), cache memory, magnetic hard drive, solid state drive, etc.). The controller 310 may be any processor-based computing device, such as a microprocessor, microcontroller, programmable logic array, etc.

The controller 310, based on the sensing instructions, may process the sensing data to generate other related information. For example, the controller 310 may generate notification and/or alerts based on the sensing data. For example, if the sensed temperature of the object 390 exceeds a particular threshold, the controller 310 may generate a notification to alert a user that there may be an issue with the object. Alternatively, or in addition, the controller 310 may process the sensing data to generate additional information. For example, if the sensing data is vibrational data, the controller 310 may perform a Fourier transform of the vibrational data to generate information related to the frequency-components of the vibrational data.

The controller 310, based on the sensing instructions, may format and send the sensing data and/or information derived from the sensing data to the user interface 330 for viewing by a user. For example, the user interface 330 may include a display, touchscreen display, speaker, keyboard, pointing device, ports, and/or other devices a user is able to perceive the sensing data and/or also provide sensing instructions to the controller 310.

Similarly, the controller 310, based on the sensing instructions, may format and send the sensing data and/or information derived from the sensing data to the remote computer on the cloud via the network interface 340 for further storing, processing, AND/OR providing it to a user. For example, instead of or in addition to the controller 310 generating notifications and/or alerts based on the sensing data, the remote computer may receive and process the sensing data to generate such notifications and/or alerts. Similarly, instead of or in addition to the controller 310 processing (e.g., Fourier transform) the sensing data to generate additional information (e.g., the frequency content of the data), the remote computer may receive and process the sensing data to generate such additional information.

Figure 5:
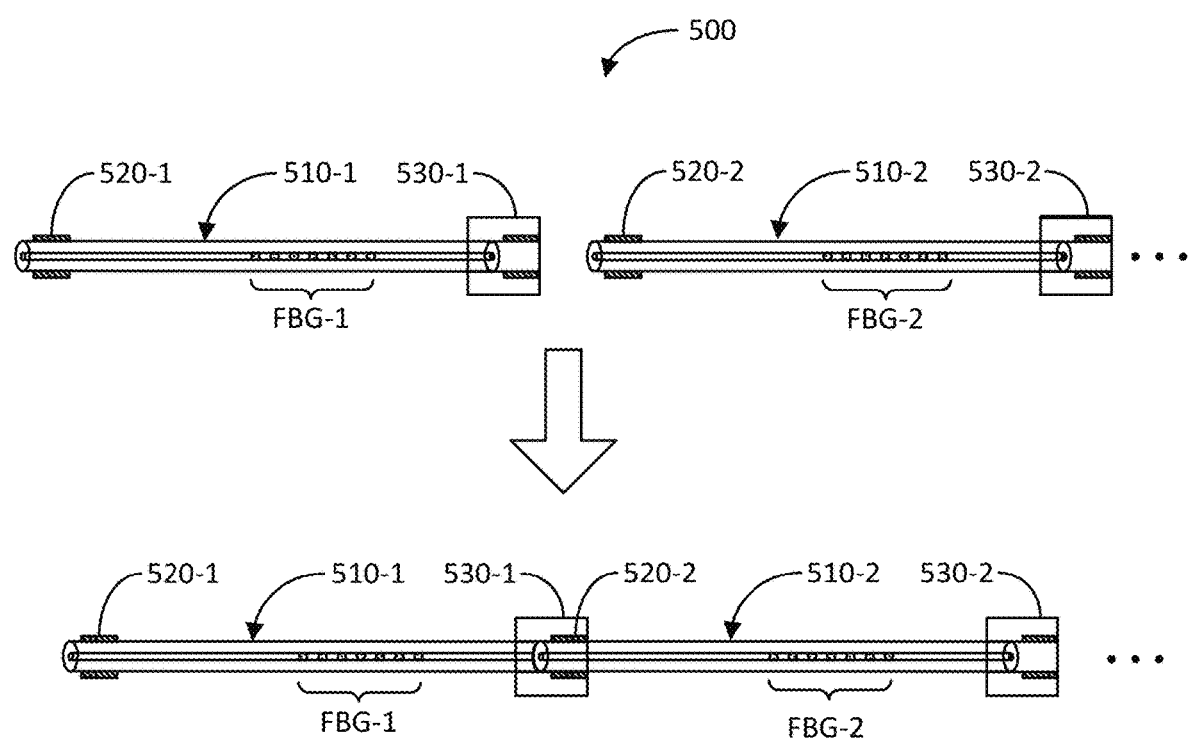
FIG. 5 illustrate side views of a FBG fiber including at least two cascadable Fiber Bragg Grating (FBG) segments prior-to-connection and after-connection in accordance with another aspect of the disclosure.

FIG. 5 illustrate side views of a FBG fiber 500 including at least two cascadable Fiber Bragg Grating (FBG) fiber segments 510-1 to 510-2 prior-to-connection and after-connection in accordance with another aspect of the disclosure. Any of the FBG fibers 360-1 to 360-N may be configured similar to FBG fiber 500 to extend the sensing coverage of the object. For example, the first deployment of FBG fibers 360-1 may have only include four sensors FBG-11 to FBG-14. However, in the future, there may be a need to provide additional FBG sensors for sensing additional parameters of the object 390. For example, the first deployment of the FBG fibers 360 may be located on the first floor of a building. Subsequently, an additional floor has been added to the building, requiring an addition four FBG sensors for sensing parameters associated with the second floor.

In this regard, the FBG fiber segment 510-1 includes a first connector 520-1 at one end of the fiber, and a second connector 530-1 at the opposite end of the fiber. In this example, the first connector 520-1 is a male connector, and the second connector 530-1 is a female connector. Similarly, the FBG fiber segment 510-2 includes a first connector 520-2 at one end of the fiber, and a second connector 530-2 at the opposite end of the fiber. In this example, the first connector 520-2 is a male connector, and the second connector 530-2 is a female connector.

In the upper portion of FIG. 5, the FBG fiber segments 510-1 and 510-2 are not connected. In the lower portion of FIG. 5, the FBG fiber segments 510-1 and 510-2 are connected. In this regard, the male connector 530-2 of FBG fiber 510-2 is threaded into the female connector 530-1 of FBG fiber 510-1. The connectors are configured to substantially coaxially align and end-to-end mate the fiber mediums of the FBG fibers 510-1 and 510-2 such that an optical signal may pass through the interface without any significant loss or distortion. Similarly, each of the interrogators 350-1 to 350-N may include a connector (e.g., female or male) for connecting to any of the FBG fiber segments 510-1 and 510-2.

The FBG fiber segment 510-1 includes an FBG sensor FBG-1 configured to sense any parameter of an object as previously discussed. Similarly, the FBG fiber segment 510-2 includes an FBG sensor FBG-2 configured to sense any parameter of an object as previously discussed. The FBG sensors FBG-1 and FBG-2 may be configured to sense the same or different type of parameters of the object. For resolving reflected optical signal ambiguity, the FBG sensors FBG-1 and FBG-2 should be configured to reflect reflected optical signals within non-overlapping bandwidths so that the interrogator is able to determine from which sensor the reflected optical signal is generated.

FIG. 6A illustrate a side view of an exemplary FBG sensor 600 in accordance with another aspect of the disclosure. In this example, the FBG sensor 600 is configured for sensing force, acceleration, and/or vibrations. Any one or more of the FBG sensors FBG-11 to FBG-NM may be configured similar to FBG sensor 600.

The FBG sensor 600 includes a base 610, a pair of flexures 620, a pair of masses 630, a pair of fiber/mass couplers (FMC) 640 and an FBG fiber 650 including at least one FBG segment 655. The FBG fiber 650 is connected to the FMCs 640, as better illustrated in the partial side-view insert depicting the mass 630, FMC 640, and FBG fiber 650. As shown, the FMCs 640 are connected to masses 630, which are connected to flexures 620, which are connected to the base 610. Each FMC/mass/flexure group is spaced from the other in the center by a spacing $S_1$, which is defined as the distance between the masses 630. Each mass 630 is suspended by the flexure 620, separating it from the base 610 by a distance $S_2$. Each of the components can be made from any material that will allow the component to accomplish its specific task, as described as follows.

The FMCs 640 are connected to the masses 630 so that the FBG fiber 650 is suspended above the $S_1$ gap. The FMCs 640 can be attached to the masses 630 anywhere on the masses 630. The depiction in FIG. 6A shows them on the top for convenience.

The masses 630 lend the necessary inertial resistance to movement, which is an integral part of the method of sensing acceleration, force, or vibration. The masses 630 can be of any shape. The inertial resistance is defined from Newton's first law of motion: objects in motion tend to stay in motion unless acted upon by an external force and objects at rest tend to stay at rest unless acted upon by an external force, applicable in inertial reference frames.

The flexures 620 can be of any shape and configuration, but allow for the masses to move in such a way that compresses or expands the FBG fiber 650. Therefore, the flexures 620, in conjunction with the masses 630 should be flexible enough so that the FBG fiber 650 is strained a noticeable amount. The "noticeable amount" is dependent on the end use and can be altered by the design of the flexures 620.

The base 610 should be rigid and both FMC/Mass/Flexure groups should be attached to the base 610. The base 610 acts as the joining piece that connects all the components hereto described together into one FBG sensor 600. The base 610 also serves as a reference for both flexures 620 to move from and create the necessary strain on the FBG fiber 650.

FIG. 6B illustrates a side view of the exemplary FBG sensor 600 when sensing acceleration, force, or vibration that produces compression of the FBG fiber 650 in accordance with another aspect of the disclosure. When a force/ acceleration/vibration-component is applied to the FBG sensor 600 in such a way that the force/acceleration/vibration is in a downward direction as shown, the masses 630, due to inertial resistance cause the flexures 620 to bend or change in shape; in this case, causing $S_2$ to increase and $S_1$ to decrease, which causes the FBG fiber 650 to compress. In other words, due to the flexures 620 respective connection to the masses 630 in an off-center manner, the left mass 630 pivots in a clockwise manner and the right mass 630 pivots in a counter-clockwise manner in response to the downward force/acceleration/vibration-component. This produces a compression-type strain upon the FBG segment 655 of the FBG fiber 650.

As discussed further herein, a broadband incident light transmitted into the FBG fiber 650 causes the FBG segment 655 to reflect a portion of the broadband incident light with a wavelength being a function of the amount the FBG segment 655 has been compressed, which, in turn, is a function of the downward force/acceleration/vibration-component applied to the FBG sensor 600. Thus, by detecting the wavelength of the reflected light, a measurement of the downward force or acceleration may be ascertained.

FIG. 6C illustrates a side view of the exemplary FBG sensor 600 when sensing acceleration/force/vibration-component that produces expansion of the FBG fiber 650 in accordance with another aspect of the disclosure. When a force/acceleration is applied to the FBG sensor 600 in such a way that the force or acceleration is in an upward direction as shown, the masses 630, due to inertial resistance cause the flexures 620 to bend or change in shape, in this case, causing $S_1$ to increase and $S_2$ to decrease, which causes the FBG fiber 600 to expand. In other words, due to the flexures 620 respective connection to the masses 630 in an off-center manner, the left mass 630 pivots in a counter-clockwise manner and the right mass 630 pivots in a clockwise manner in response to the upward force or acceleration. This produces an expansion-type strain upon the FBG segment 655 of the FBG fiber 650.

Similarly, a broadband incident light transmitted into the FBG fiber 650 causes the FBG segment 655 to reflect a portion of the broadband incident light with a wavelength being a function of the amount the FBG segment 655 has expanded, which, in turn, is a function of the upward force/acceleration/vibration-component applied to the FBG sensor 600. Thus, by detecting the wavelength of the reflected light, a measurement of the upward force or acceleration may be ascertained.

The two scenarios described above can be extended for more general configurations of the general design and arrangement of parts by realizing that any relative placement of the flexures 620 on the masses 630, keeping the flexures 620 connected to the base 610 and the masses 630 connected to the FMCs 640, will allow for sensing of force/acceleration in any direction orthogonal to the ones described in FIGS. 6B-6C. The only conceptual requirement is that the flexures 620 be off-center in at least one of the three axes of the masses 630 in a mirrored orientation so that the Flexures 620 will bend to create strain in the FBG fiber 650 due to the Masses' inertial resistance.

Figure 7A:
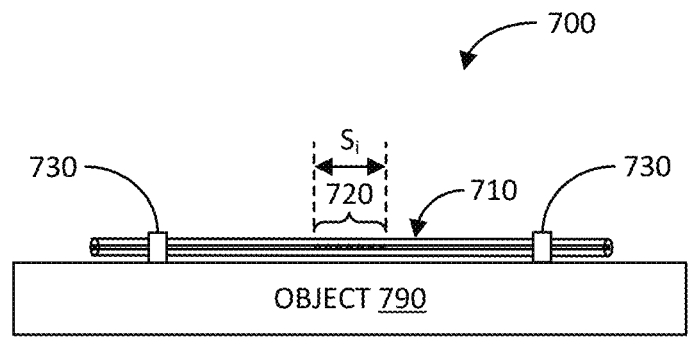
FIGS. 7A-7C illustrate side views of an exemplary FBG sensor for sensing strain in its intrinsic, expanded, and compressed states in accordance with another aspect of the disclosure.

FIG. 7A illustrate a side view of an exemplary FBG sensor 700 configured to sense strain upon or bending of an object 790 in accordance with another aspect of the disclosure. Any one or more of the FBG sensors FBG-11 to FBG-NM may be configured similar to FBG sensor 700.

In particular, the FBG sensor 700 includes an FBG fiber 710 including an FBG segment 720. The FBG sensor 700 further includes a pair of couplers 730 mechanically coupling the FBG fiber 710 to the object 790. The couplers 730 may be positioned on both sides of the FBG segment 720, respectively. In FIG. 7A, the FBG fiber 710 is in an intrinsic state $S_i$, where there is no expansion or compression acting upon the FBG segment 720. It shall be understood that the FBG fiber 710 may be pretension to tune the wavelength of the reflected optical signal when no strain-of-interest is being applied.

Figure 7B:
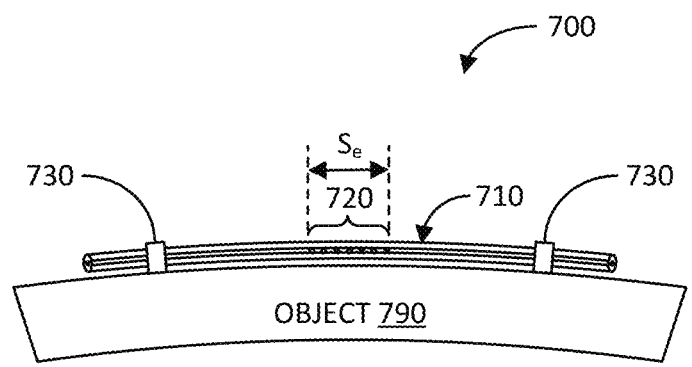

FIG. 7B illustrate a side view of the exemplary FBG sensor 700 when the FBG segment 720 is in an expanded state due to strain upon or bending of the object 790 in accordance with another aspect of the disclosure. As illustrated, when the object 790 bends in a manner that pulls the couplers 730 away from each other, the FBG segment 720 expands by a certain amount $S_e$-$S_i$. Accordingly, the wavelength of an optical signal reflected off the FBG segment 720 due to an incident optical signal is greater than the wavelength of an optical signal reflected off the FBG segment 720 when it is in the intrinsic or pretension state. The corresponding interrogator receives the reflected optical signal and generates the strain data based on its wavelength.

Figure 7C:
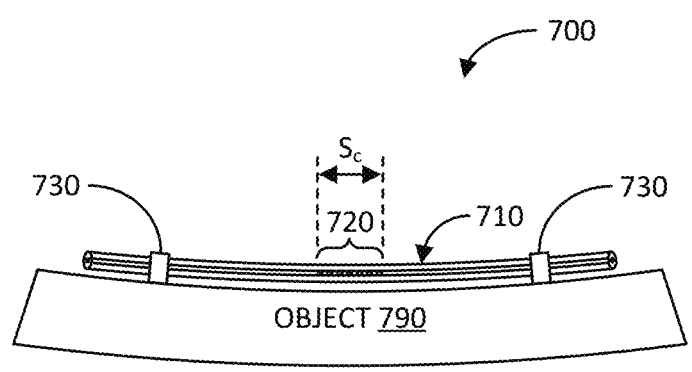

FIG. 7C illustrate a side view of the exemplary FBG sensor 700 when the FBG segment 720 is in a compressed state due to strain upon or bending of the object 790 in accordance with another aspect of the disclosure. As illustrated, when the object 790 bends in a manner that pushes the couplers 730 closer together, the FBG segment 720 compresses by a certain amount $S_i$-$S_c$. Accordingly, the wavelength of an optical signal reflected off the FBG segment 720 due to an incident optical signal is less than the wavelength of an optical signal reflected off the FBG segment 720 when it is in the intrinsic or pretension state. The corresponding interrogator receives the reflected optical signal and generates the strain data based on its wavelength.

Figure 8A:
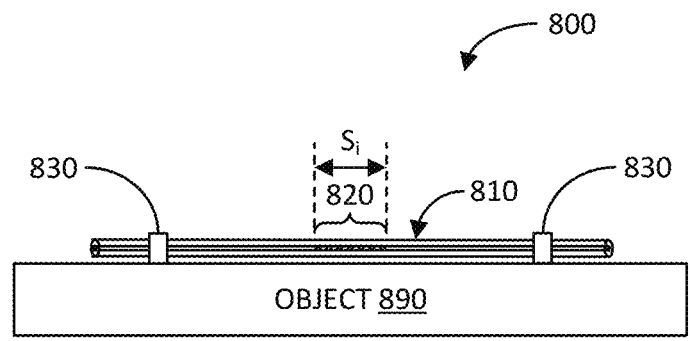
FIGS. 8A-8C illustrate side views of an exemplary FBG sensor for sensing pressure in its intrinsic, expanded, and compressed states in accordance with another aspect of the disclosure.

FIG. 8A illustrate a side view of an exemplary FBG sensor 800 configured to sense positive or negative pressure upon an object 890 in accordance with another aspect of the disclosure. Any one or more of the FBG sensors FBG-11 to FBG-NM may be configured similar to FBG sensor 800.

In particular, the FBG sensor 800 includes an FBG fiber 810 including an FBG segment 820. The FBG sensor 800 further includes a pair of couplers 830 mechanically coupling the FBG fiber 810 to the object 890. The couplers 830 may be positioned on both sides of the FBG segment 820, respectively. In FIG. 8A, the FBG fiber 810 is in an intrinsic state $S_i$, where there is no expansion or compression upon the FBG segment 820. It shall be understood that the FBG fiber 810 may be pretension to tune the wavelength of the reflected optical signal when no pressure-of-interest is being applied.

Figure 8B:
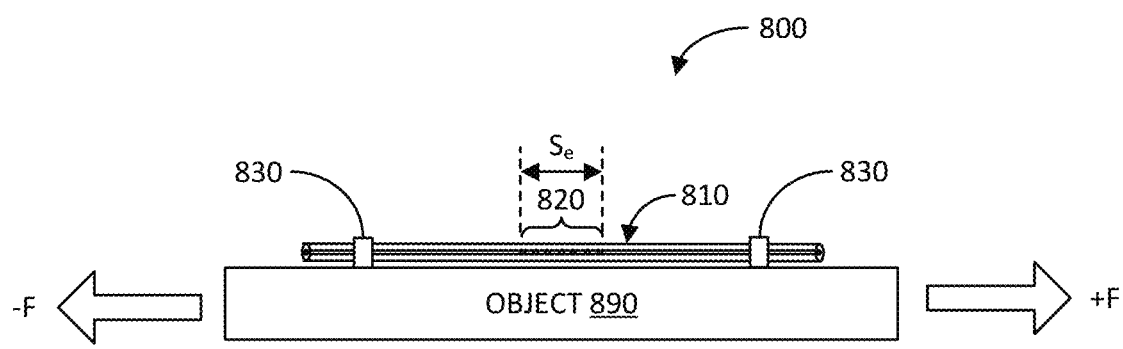

FIG. 8B illustrate a side view of the exemplary FBG sensor 800 when the FBG segment 820 is in an expanded state due to negative pressure applied to the object 890 in accordance with another aspect of the disclosure. As illustrated, when negative pressure is applied to object 890 in a manner that pulls the couplers 830 away from each other, the FBG segment 820 expands by a certain amount $S_e$-$S_i$. Accordingly, the wavelength of an optical signal reflected off the FBG segment 820 due to an incident optical signal is greater than the wavelength of an optical signal reflected off the FBG segment 820 when it is in the intrinsic or pretension state. The corresponding interrogator receives the reflected optical signal and generates the pressure data based on its wavelength.

Figure 8C:
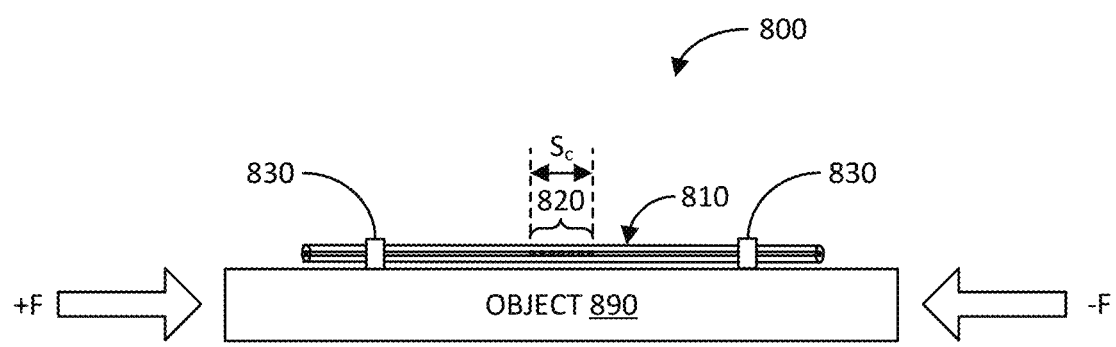

FIG. 8C illustrate a side view of the exemplary FBG sensor 800 when the FBG segment 820 is in a compressed state due to positive pressure applied to the object 890 in accordance with another aspect of the disclosure. As illustrated, when positive pressure is applied to the object 890 in a manner that pushes the couplers 830 closer together, the FBG segment 820 compresses by a certain amount $S_i$-$S_c$. Accordingly, the wavelength of an optical signal reflected off the FBG segment 820 due to an incident optical signal is less than the wavelength of an optical signal reflected off the FBG segment 820 when it is in the intrinsic or pretension state. The corresponding interrogator receives the reflected optical signal and generates the pressure data based on its wavelength.

Figure 9A:
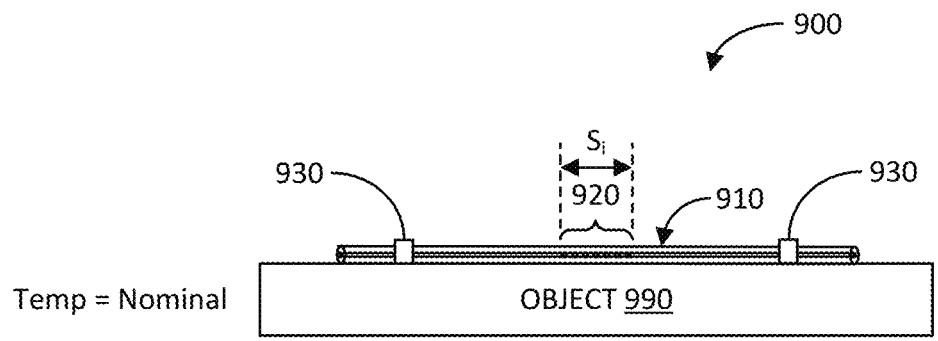
FIGS. 9A-9C illustrate side views of an exemplary FBG sensor for sensing temperature in its intrinsic, expanded, and compressed states in accordance with another aspect of the disclosure.

FIG. 9A illustrate a side view of an exemplary FBG sensor 900 configured to sense temperature of an object 990 in accordance with another aspect of the disclosure. Any one or more of the FBG sensors FBG-11 to FBG-NM may be configured similar to FBG sensor 900.

In particular, the FBG sensor 900 includes an FBG fiber 910 including an FBG segment 920. The FBG sensor 900 further includes a pair of couplers 930 mechanically coupling the FBG fiber 910 to the object 990. The couplers 930 may be positioned on both sides of the FBG segment 920, respectively. In FIG. 9A, the FBG fiber 910 is in nominal state $S_n$, where there is some expansion or compression upon the FBG segment 920 based on a nominal temperature. It shall be understood that the FBG fiber 910 may be pretension to tune the wavelength of the reflected optical signal when the temperature of the object 990 is nominal.

Figure 9B:
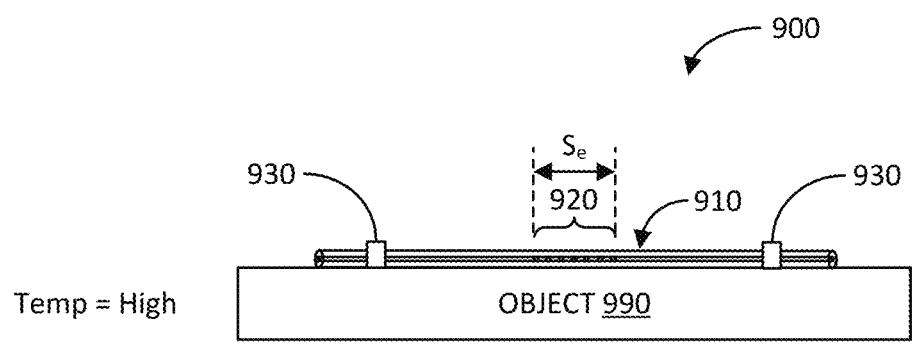

FIG. 9B illustrate a side view of the exemplary FBG sensor 900 when the FBG segment 920 is in an expanded state due to an increase in the temperature of the object 990 relative to nominal temperature in accordance with another aspect of the disclosure. As illustrated, when the temperature of the object 990 is above nominal, the object expands and pulls the couplers 930 away from each other by a certain amount $S_e$-$S_i$. Accordingly, the wavelength of an optical signal reflected off the FBG segment 920 due to an incident optical signal is greater than the wavelength of an optical signal reflected off the FBG segment 920 when it is in the intrinsic or pretension state. The corresponding interrogator receives the reflected optical signal and generates the temperature data based on its wavelength.

Figure 9C:
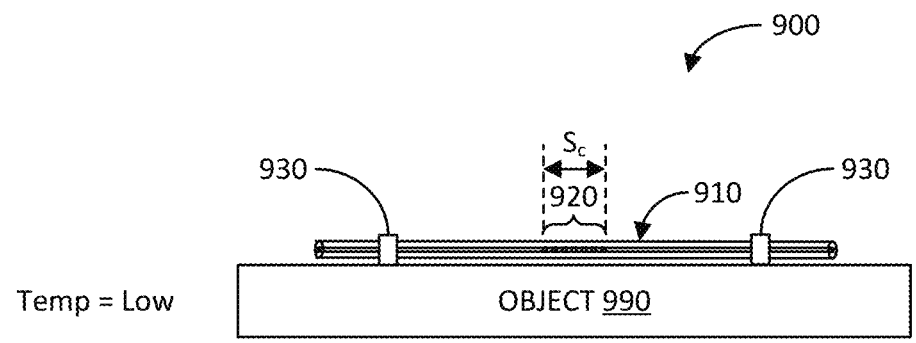

FIG. 9C illustrate a side view of the exemplary FBG sensor 900 when the FBG segment 920 is in a compressed state due to a decrease in temperature of the object 990 relative to nominal temperature in accordance with another aspect of the disclosure. As illustrated, when the temperature of the object 990 is below nominal, the object contracts and pushes the couplers 930 closer together by a certain amount $S_i$-$S_c$. Accordingly, the wavelength of an optical signal reflected off the FBG segment 920 due to an incident optical signal is less than the wavelength of an optical signal reflected off the FBG segment 920 when it is in the intrinsic or pretension state. The corresponding interrogator receives the reflected optical signal and generates the temperature data based on its wavelength.

Figure 10A:
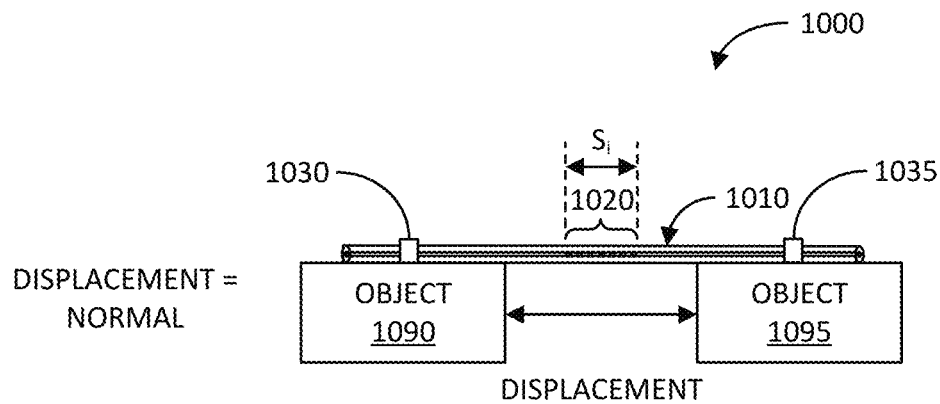
FIGS. 10A-10C illustrate side views of an exemplary FBG sensor for sensing displacement in its intrinsic, expanded, and compressed states in accordance with another aspect of the disclosure.

FIG. 10A illustrate a side view of an exemplary FBG sensor 1000 configured to sense displacement of a first object 1090 with respect to a second object 1095 in accordance with another aspect of the disclosure. Any one or more of the FBG sensors FBG-11 to FBG-NM may be configured similar to FBG sensor 1000.

In particular, the FBG sensor 1000 includes an FBG fiber 1010 including an FBG segment 1020. The FBG sensor 1000 further includes a pair of couplers 1030 and 1035 mechanically coupling the FBG fiber 1010 to the first and second objects 1090 and 1095, respectively. The first and second couplers 1030 and 1035 may be positioned on both sides of the FBG segment 1020, respectively. In FIG. 10A, the FBG fiber 910 is in an intrinsic state $S_i$, where there is no expansion or compression acting upon the FBG segment 1020 based on a nominal displacement between the first and second objects 1090 and 1095. It shall be understood that the FBG fiber 1010 may be pretension to tune the wavelength of the reflected optical signal when there is a nominal displacement between the first and second objects 1090 and 1095.

Figure 10B:
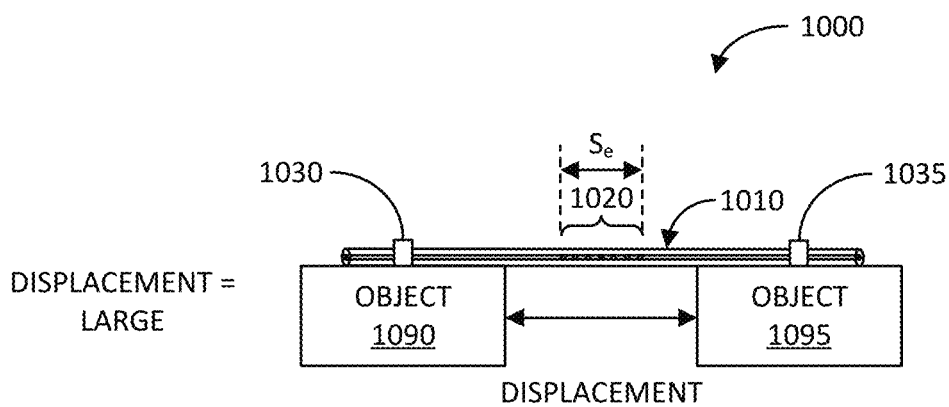

FIG. 10B illustrate a side view of the exemplary FBG sensor 1000 when the FBG segment 1020 is in an expanded state due to an increase in the displacement between the first and second objects 1090 and 1095 beyond nominal displacement in accordance with another aspect of the disclosure. As illustrated, when the displacement between the objects 1090 and 1095 is greater than nominal, the increasing displacement of the objects pulls the couplers 1030 and 1035 away from each other by a certain amount $S_e$-$S_i$. Accordingly, the wavelength of an optical signal reflected off the FBG segment 1020 due to an incident optical signal is greater than the wavelength of an optical signal reflected off the FBG segment 1020 when it is in the intrinsic or pretension state. The corresponding interrogator receives the reflected optical signal and generates the displacement data based on its wavelength.

Figure 10C:
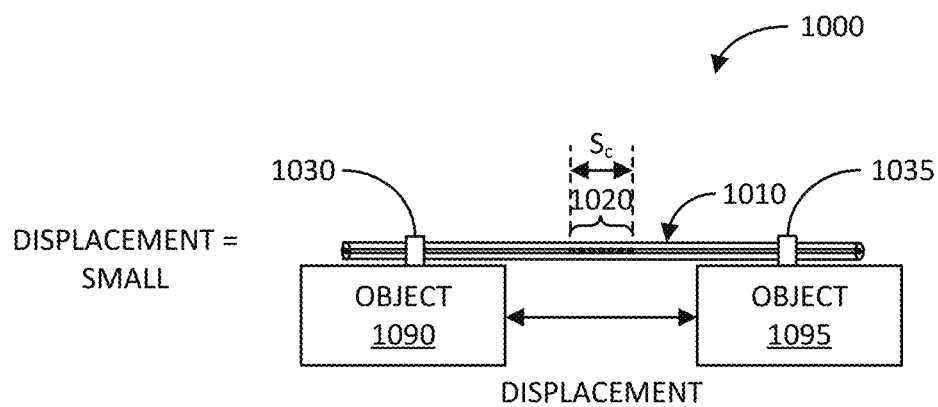

FIG. 10C illustrate a side view of the exemplary FBG sensor 1000 when the FBG segment 1020 is in a compressed state due to a decrease in the displacement between the first and second objects 1090 and 1095 smaller than nominal displacement in accordance with another aspect of the disclosure. As illustrated, when the displacement between the objects 1090 and 1095 is less than nominal, the decreasing displacement of the objects pushes the couplers 1030 and 1035 closer together by a certain amount $S_i$-$S_c$. Accordingly, the wavelength of an optical signal reflected off the FBG segment 1020 due to an incident optical signal is less than the wavelength of an optical signal reflected off the FBG segment 1020 when it is in the intrinsic or pretension state. The corresponding interrogator receives the reflected optical signal and generates the displacement data based on its wavelength.

Figure 11:
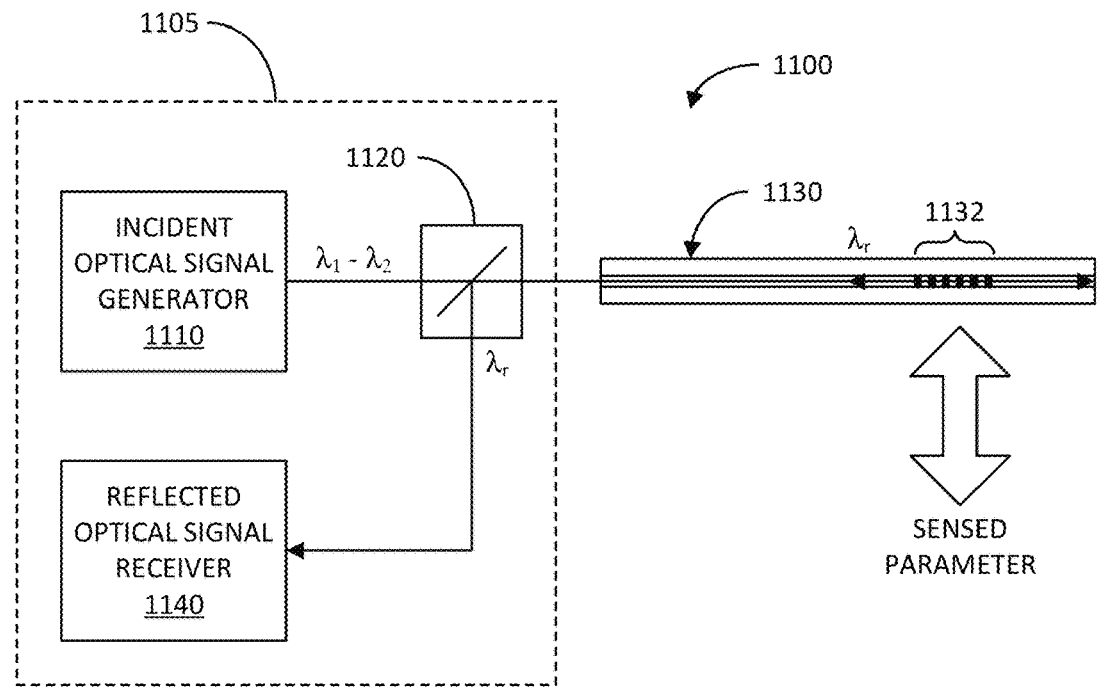
FIG. 11 illustrates a block diagram of an exemplary interrogator coupled to an FBG fiber in accordance with another aspect of the disclosure.

FIG. 11 illustrates a block diagram of an exemplary system 1100 including an interrogator 1105 optically coupled to an FBG fiber 1130 in accordance with another aspect of the disclosure. Any of the interrogator-FBG fiber pair 350-1/360-1 to 350-N/360-N may be configured similar to the system 1100. The interrogator 1105 includes an incident optical signal generator 1110, an optical coupler 1120, and a reflected optical signal receiver 1140. The FBG fiber 1130 includes an FBG segment 1132, which is compressed and/or expanded in response to a sensed parameter (e.g., acceleration, force, vibration, strain, pressure, temperature, displacement, etc.).

The incident optical signal generator 1110 generates a broadband optical signal with a wavelength range of $\lambda_1$ to $\lambda_2$. The entire wavelength range $\lambda_1$ to $\lambda_2$ may be generated at the same time as in a single broadband transmission, or may be swept in a time manner (e.g., in a triangular or sawtooth time manner). The optical coupler 1120 allows the broadband optical signal $\lambda_1$-$\lambda_2$ to pass through from a first port to a second port without any significant loss, while directing a reflected optical signal $\lambda_r$ from the second port to a third port.

The FBG fiber 1130 is coupled to the second port of the optical coupler 1120. The FBG fiber 1130 receives the broadband optical signal $\lambda_1$-$\lambda_2$ and generates the reflected optical signal $\lambda_r$ when the broadband optical signal $\lambda_1$-$\lambda_2$ encounters the FBG segment 1132 of the FBG fiber 1130. As discussed, the wavelength $\lambda_r$ of the reflected optical signal is a function of the sensed parameter acting upon the FBG segment 1132. For example, if the sensed parameter causes the FBG segment 1132 to be compressed, the wavelength $\lambda_r$ of the reflected signal will be smaller than the wavelength of the reflected signal when the sensed parameter is not or nominally acting upon the FBG segment 1132. Similarly, if the sensed parameter causes the FBG segment 1132 to expand, the wavelength $\lambda_r$ of the reflected signal will be larger than the wavelength of the reflected signal when the sensed parameter is not or nominally acting upon the FBG segment 1132.

The reflected optical signal receiver 1140 is coupled to the third port of the optical coupler 1120. Accordingly, the receiver 1140 receives and processes the reflected optical signal to determine its wavelength $\lambda_r$. Once the receiver 1140 determines the wavelength $\lambda_r$, it can map the wavelength $\lambda_r$ to the sensed parameter. As an example, in the case where the broadband optical signal $\lambda_1$-$\lambda_2$ is swept in a defined timed manner, the receiver 1140 may determine the time at which the reflected optical signal is received to ascertain its wavelength $\lambda_r$ (e.g., the receiver 1140 performs a time-to-wavelength conversion).

Figure 12:
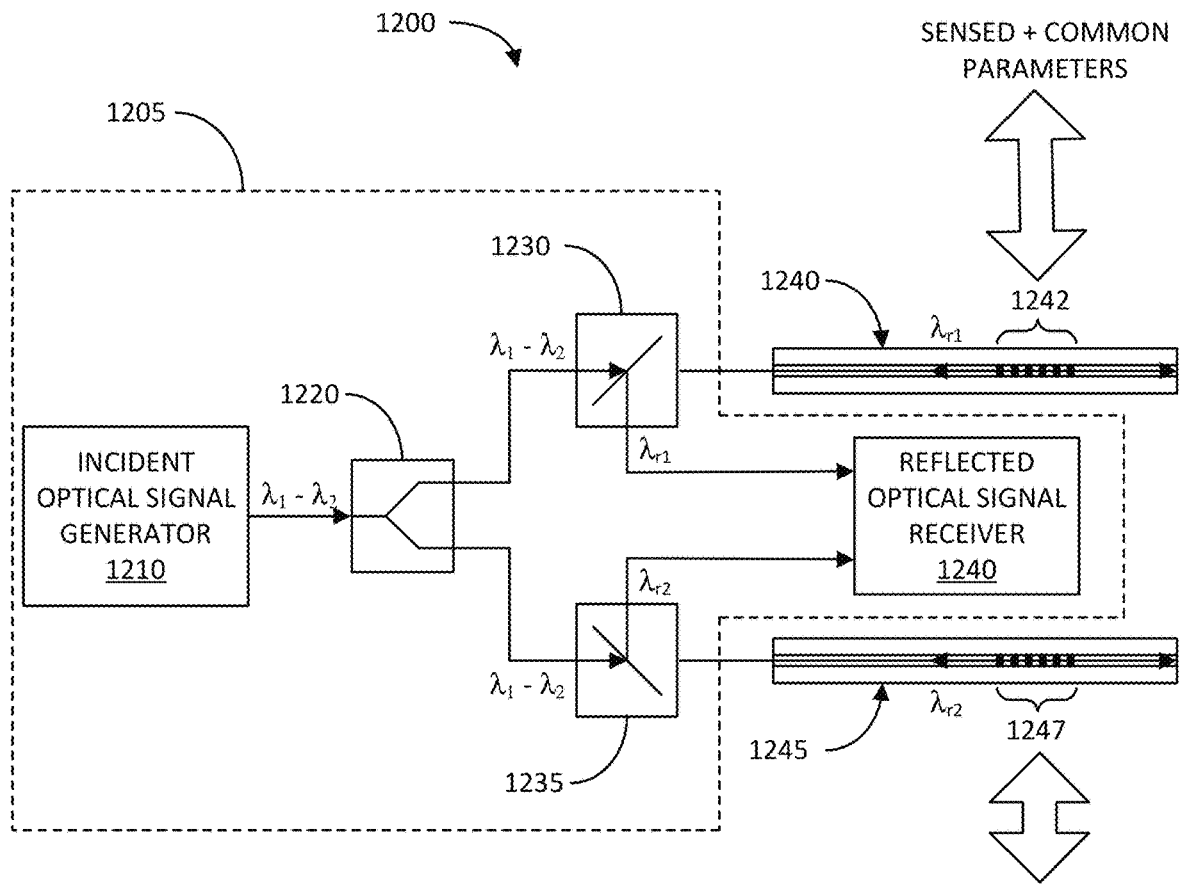
FIG. 12 illustrates a block diagram of an exemplary interrogator coupled to measuring and reference FBG fibers in accordance with another aspect of the disclosure.

FIG. 12 illustrates a block diagram of yet another exemplary system 1200 including an interrogator 1205 optically coupled to a pair of FBG fibers 1240 and 1245 in accordance with another aspect of the disclosure. Any of the interrogator-FBG fiber pair 350-1/360-1 to 350-N/360-N may be configured similar to the system 1200 for performing differential sensing of the sensed parameter. The system 1200 is similar to the system 1100, but further includes a reference FBG fiber and associated components, as discussed further herein. The reference FBG fiber is used to cancel out any variation in the wavelength of the reflected optical signal due to a common parameter (e.g., temperature when acceleration, force, vibration, strain, pressure, displacement is being sensed) acting upon both FBG fibers 1240 and 1245. For example, a change in temperature causes the FBG segment to expand or contract, which may be erroneously interpreted by a receiver as a changed in the sensed parameter.

To eliminate or reduce the likelihood of such error, a receiver receives the reflected optical signals from the "measuring" FBG fiber and the "reference" FBG fiber. By performing a differential analysis on the reflected optical signals (e.g., measuring the difference between their respective wavelengths), the receiver is able to cancel out effects on the sensed parameter (e.g., acceleration, force, vibration, strain, pressure, displacement, etc.) due to changes in the common parameter (e.g., temperature).

In particular, the interrogator 1205 includes an incident optical signal generator 1210, an optical splitter 1220, a first optical coupler 1230, a second optical coupler 1235, and a reflected optical signal receiver 1240. The "measuring" FBG fiber 1240 includes an FBG segment 1242, and the "reference" FBG fiber 1245 includes an FBG segment 1247.

The incident optical signal generator 1220 generates a broadband optical signal with a wavelength range of $\lambda_1$ to $\lambda_2$, as a single broadband transmission or in a swept time manner (e.g., in a triangular or sawtooth time manner). The optical splitter 1220 splits the broadband optical signal $\lambda_1$-$\lambda_2$ to generate a first incident optical signal $\lambda_1$-$\lambda_2$ for the measuring FBG fiber 1240 and a second incident optical signal $\lambda_1$-$\lambda_2$ for the reference FBG fiber 1245. Although not shown, an optical amplifier may be positioned between the incident optical signal generator 1210 and the optical splitter 1220 to amplify the broadband optical signal generated by the incident optical signal generator 1210.

The first optical coupler 1230 allows the first incident optical signal $\lambda_1$-$\lambda_2$ to pass through from a first port to a second port without any significant loss, while directing a first reflected optical signal $\lambda_{r1}$ from the second port to a third port. The measuring FBG fiber 1240 is coupled to the second port of the first optical coupler 1230. Accordingly, the measuring FBG fiber 1240 receives the first incident optical signal $\lambda_1$-$\lambda_2$ and generates the first reflected optical signal $\lambda_{r1}$ when the first incident optical signal $\lambda_1$-$\lambda_2$ encounters the FBG segment 1242 of the measuring FBG fiber 1240. As discussed, the wavelength $\lambda_{r1}$ of the first reflected optical signal is a function of the sensed and common parameters acting upon the FBG segment 1242.

The second optical coupler 1235 allows the second incident optical signal $\lambda_1$-$\lambda_2$ to pass through from a first port to a second port without any significant loss, while directing a second reflected optical signal $\lambda_{r2}$ from the second port to a third port. The reference FBG fiber 1245 is coupled to the second port of the second optical coupler 1235. Accordingly, the reference FBG fiber 1245 receives the second incident optical signal $\lambda_1$-$\lambda_2$ and generates the second reflected optical signal $\lambda_{r2}$ when the second incident optical signal $\lambda_1$-$\lambda_2$ encounters the FBG segment 1247 of the reference FBG fiber 1245. Although the sensed parameter is not acting upon the reference FBG fiber 1245, the wavelength $\lambda_{r2}$ of the second reflected optical signal is a function of the common parameter acting upon the FBG segment 1247.

The reflected optical signal receiver 1240 is coupled to the third ports of the first and second optical couplers 1230 and 1235, respectively. Accordingly, the receiver 1240 receives and processes the reflected optical signals and determines the difference $\lambda_{r1}$-$\lambda_{r2}$ in their respective wavelengths. Once the receiver 1240 determines the wavelength difference $\lambda_{r1}$-$\lambda_{r2}$, it can map the difference $\lambda_{r1}$-$\lambda_{r2}$ to the parameter being sensed or measured. If there is a change in the common parameter, and the FBG segments 1242 and 1247 are positioned close enough to each other such that the segments are affected substantially the same with the common parameter change, the wavelengths $\lambda_{r1}$ and $\lambda_{r2}$ of the reflected optical signals change substantially the same with common parameter change. Thus, there would be substantially no net effect on the wavelength difference $\lambda_{r1}$-$\lambda_{r2}$ due to common parameter change; thereby canceling out effects due to common parameter.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
    at least one optical fiber including at least one fiber Bragg Grating (FBG) sensor coupled to or situated proximate an object, wherein the object comprises a structure with non-moving parts or a machine with moving parts;
    at least one interrogator configured to:
        generate at least one incident optical signal for transmission via the at least one optical fiber, respectively;

receive at least one reflected optical signal from each of the at least one optical fiber; and generate data of at least one sensed parameter of the object based on at least one wavelength of the at least one reflected optical signal;

a controller configured to control the at least one interrogator; and a user interface or network interface configured to receive instructions related to whether the object comprises the structure with non-moving parts or the machine with moving parts, wherein the controller is configured to control the at least one interrogator based on the instructions, and wherein the controller is configured to control a rate at which the at least one incident optical signal is transmitted via the at least one optical fiber based on the instructions.

2. The apparatus of claim 1, wherein the controller is configured to process the data to generate additional information.

3. The apparatus of claim 2, wherein the additional information comprises a notification or alert related to the at least one sensed parameter of the object.

4. The apparatus of claim 2, wherein the process of the data comprises performing a Fourier Transform on the data, and wherein the additional information comprises frequency information related to the data.

5. The apparatus of claim 4, wherein the at least one sensed parameter comprises vibrations of the object, and wherein the frequency information of the data comprises frequency components of the vibrations.

6. The apparatus of claim 1, wherein the controller is configured to control a bandwidth of the at least one incident optical signal transmitted via the at least one optical fiber based on the instructions.

7. The apparatus of claim 1, wherein the user interface is configured to receive instructions related to how to process the data from a user, wherein the controller is configured to process the data to generate additional information based on the instructions.

8. The apparatus of claim 1, wherein the user interface is configured to provide the data or additional information based on the data in at least one of visual or audio format to a user.

9. The apparatus of claim 8, wherein the additional information comprises at least one of a notification or alert related to the at least one sensed parameter of the object, or frequency information related to the at least one sensed parameter of the object.

10. The apparatus of claim 1, wherein the network interface is configured to receive the instructions from a remote computer on a network cloud.

11. The apparatus of claim 1, wherein the network interface is configured to send the data or additional information based on the data to a remote computer on a network cloud.

12. The apparatus of claim 11, wherein the additional information comprises at least one of a notification or alert related to the at least one sensed parameter of the object, or frequency information related to the at least one sensed parameter of the object.

13. The apparatus of claim 1, wherein each of the at least one optical fiber comprises a set of cascaded FBG fiber segments connected to each other via mated male-female connectors, wherein each cascaded FBG fiber segment comprises at least one FBG sensor.

14. The apparatus of claim 1, wherein the at least one sensed parameter of the object comprises at least one of acceleration, force, or vibration.

15. The apparatus of claim 1, wherein the at least one sensed parameter of the object comprises strain acting upon the object.

16. The apparatus of claim 1, wherein the at least one sensed parameter of the object comprises pressure exerted on the object.

17. The apparatus of claim 1, wherein the at least one sensed parameter of the object comprises temperature of the object.

18. The apparatus of claim 1, wherein the at least one sensed parameter of the object comprises displacement of the object with respect to another object.

19. An apparatus of, comprising:
at least one optical fiber including at least one fiber Bragg Grating (FBG) sensor coupled to or situated proximate an object, wherein the object comprises a structure with non-moving parts or a machine with moving parts;
at least one interrogator configured to:
generate at least one incident optical signal for transmission via the at least one optical fiber, respectively;
receive at least one reflected optical signal from each of the at least one optical fiber; and
generate data of at least one sensed parameter of the object based on at least one wavelength of the at least one reflected optical signal;
a controller configured to control the at least one interrogator; and
a user interface or network interface configured to receive instructions related to whether the object comprises the structure with non-moving parts or the machine with moving parts, wherein the controller is configured to control the at least one interrogator based on the instructions, wherein the user interface or network interface is configured to receive instructions related to a modification to the at least one optical fiber, and wherein the controller is configured to control a bandwidth of the at least one incident optical signal transmitted via the at least one optical fiber based on the modification instructions.

20. The apparatus of claim 19, wherein the controller is configured to control at least one of a rate at which the at least one incident optical signal is transmitted via the at least one optical fiber.

21. The apparatus of claim 19, wherein the bandwidth is increased if the modification includes adding one or more FBG sensors to the at least one optical fiber.

22. The apparatus of claim 19, wherein the bandwidth is decreased if the modification includes removing one or more FBG sensors to the at least one optical fiber.

23. An apparatus, comprising:
at least one optical fiber including at least one fiber Bragg Grating (FBG) sensor coupled to or situated proximate an object, wherein the object comprises a structure with non-moving parts or a machine with moving parts;
at least one interrogator configured to:
generate at least one incident optical signal for transmission via the at least one optical fiber, respectively;
receive at least one reflected optical signal from each of the at least one optical fiber; and
generate data of at least one sensed parameter of the object based on at least one wavelength of the at least one reflected optical signal;
a controller configured to control the at least one interrogator; and a user interface or network interface configured to receive instructions related to whether the object comprises the structure with non-moving parts or the machine with moving parts, wherein the controller is configured to control the at least one interrogator based on the instructions;

wherein the controller is configured to control a rate at which the at least one incident optical signal is transmitted via the at least one optical fiber based on the instructions, wherein the rate depends on whether the object comprises the structure with non-moving parts or the machine with moving parts.

24. The apparatus of claim 23, wherein the rate is a first rate if the object comprises the structure with non-moving parts, wherein the rate is a second rate if the object comprises the machine with moving parts, wherein the first rate is lower than the second rate.

* * * * *